Aug. 3, 1965          R. A. BROWN                3,198,987
                   ELECTRIC CONTROLLER
Filed March 8, 1963                         3 Sheets-Sheet 1
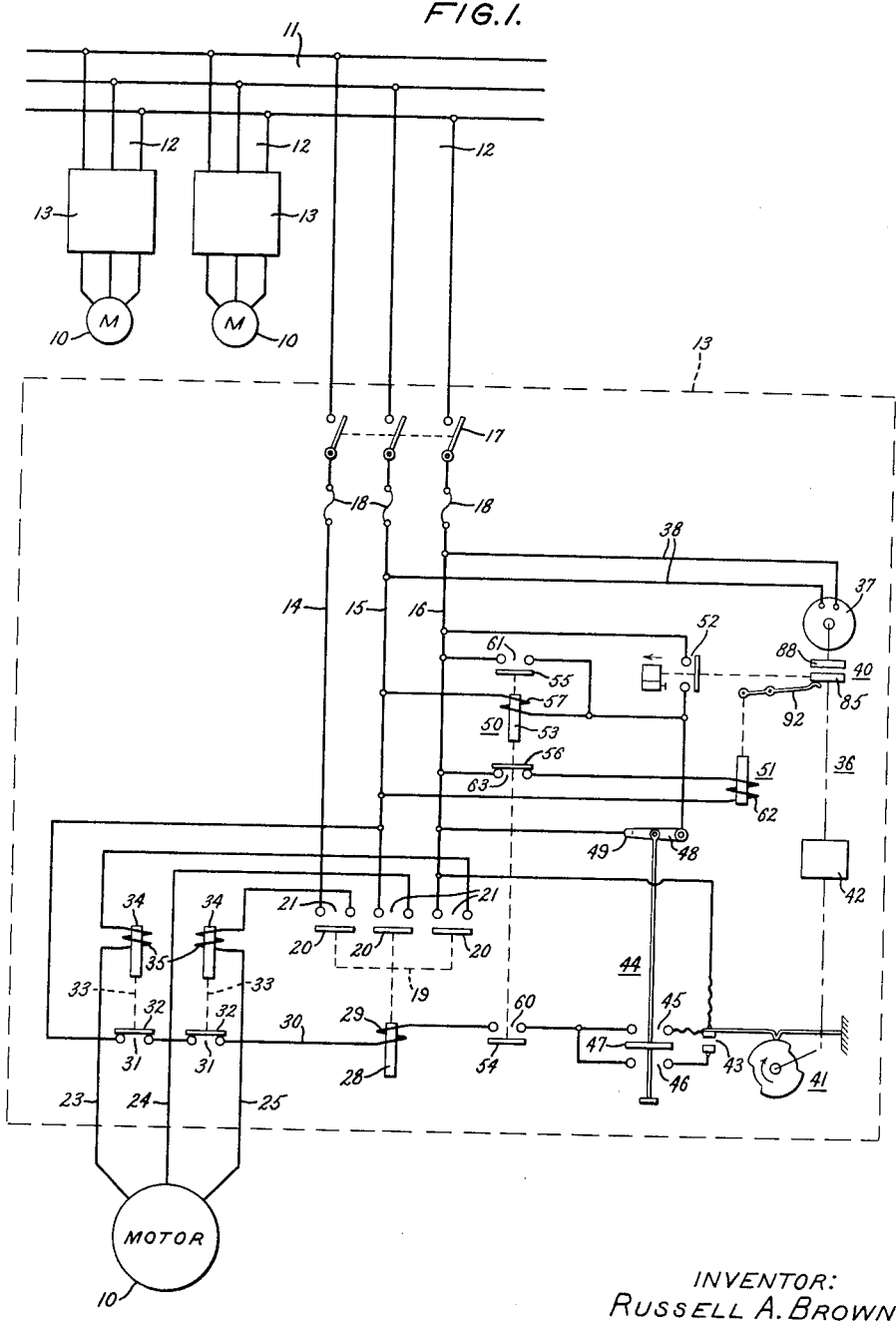
INVENTOR:
RUSSELL A. BROWN,
BY David M. Schiller
ATTORNEY.

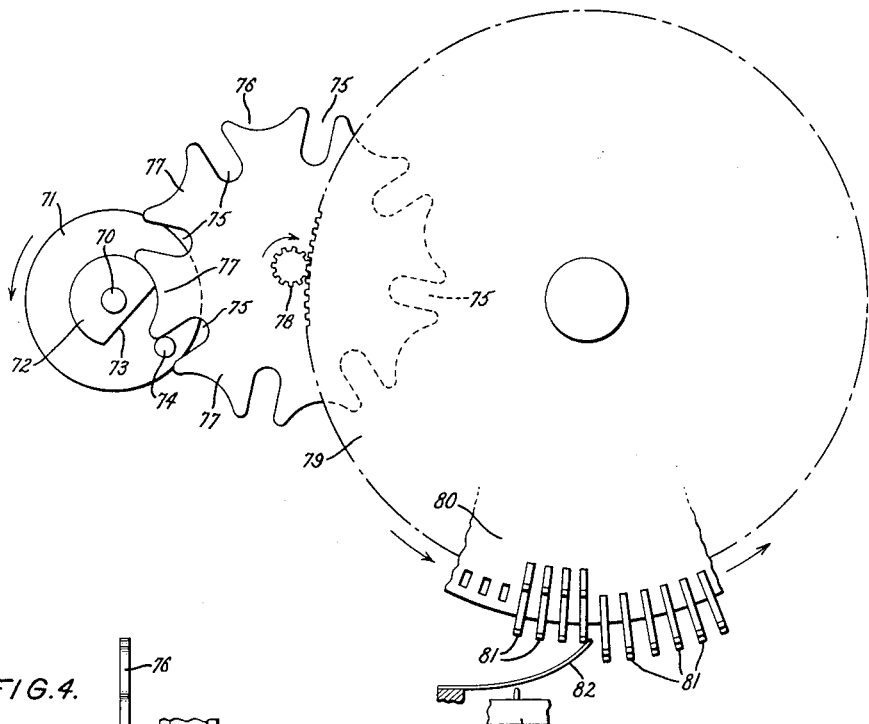
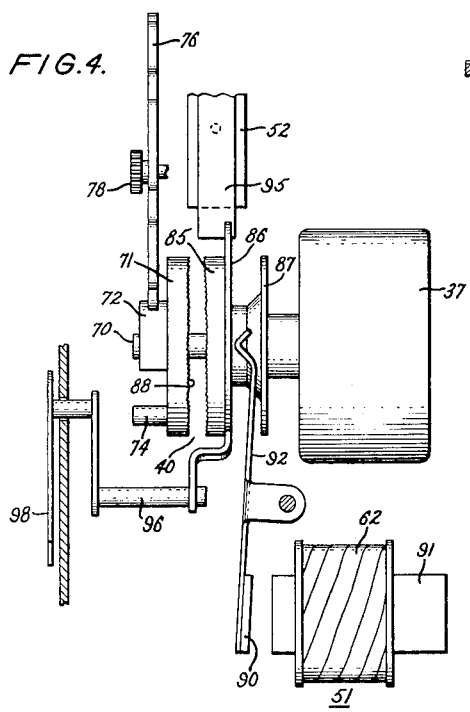

United States Patent Office 3,198,987
Patented Aug. 3, 1965

---

3,198,987
ELECTRIC CONTROLLER
Russell A. Brown, Bloomington, Ill., assignor to General
Electric Company, a corporation of New York
Filed Mar. 8, 1963, Ser. No. 263,911
13 Claims. (Cl. 317—13)

This invention relates to electric controllers for energizing switching devices, such as magnetic contactors, and has particular relation to motor starter systems for protectively energizing a plurality of motors from a common power source, such as in oil field pumping installations where a plurality of motors are energized during the starting or restoration of pumping.

Electric controllers for oil field pumping installations conventionally include apparatus for performing three basic functions consisting of a programming function, an automatic restarting function and an anti "pumping" function. The programming function is performed by means effective to control energization of the associated motor contactor in accordance with a predetermined schedule, such for example as a fifteen minute "on" and fifteen minute "off" schedule. The programming function is ordinarily obtained by means of a time switch which is continuously rotated from a timing motor through a suitable gear train. The automatic restart function is performed by means which operates to energize the associated motor a fixed time after power is restored following a power outage or after normal voltage is restored following a severe voltage dip. Such an arrangement lessens the possibility that a number of motors will be simultaneously energized following restoration of normal voltage and is conventionally obtained by the provision of a timing device which is energized when voltage is restored and which effects energization of its associated motor a fixed time after restoration of voltage. The third function is to prevent contactor "pumping" which may result in damage to the contactor and could occur if the line voltage were to sag below the contactor drop-out point in the event an effort were made to start a motor during an undervoltage condition. When the contactor drops out, the line voltage is thus relieved of the motor load which causes the line voltage to rise, whereby the contactor coil again picks up and connects the motor to the line. A very desirable arrangement for preventing such contactor "pumping" is set forth in U.S. Patent 3,062,990.

In the design of electric controllers it is very desirable that the apparatus employed for providing the above-described three basic functions include a minimum number of comparatively inexpensive parts which are arranged so that certain parts contribute to the performance of more than one of such functions. It is also very desirable that provision be made for permitting variations in the setting of the motor restart time after restoration of power following a power outage so that the motors having the largest ratings will advantageously be energized prior to those having smaller ratings. It is further desirable to make provision for operating the program time switch intermittently rather than continuously so as to minimize wear on the associated parts including the gear train.

It is therefore a primary object of the present invention to provide a novel and improved electric controller for controlling energization of a load.

It is another object of the invention to provide a novel and improved electric controller for controlling energization of a motor including a program timer which is operated intermittently.

It is a further object of the invention to provide a novel and improved electric controller for controlling energization of a motor including a program timer and an automatic restart timer which are operable from a common timing motor.

It is still another object of the invention to provide a novel and improved electric controller for controlling energization of an electromagnetic switching device which controls energization of a motor and which also controls energization of an automatic motor restart timing mechanism.

It is a still further object of the invention to provide a novel and improved electric controller for controlling energization of a motor including a motor restart timer with means for readily varying the restart timing period over a substantial range.

It is still another object of the invention to provide a novel and improved electric controller for controlling energization of a motor incorporating a minimum number of inexpensive parts for effecting a program timing function, an automatic restart function and an anti "pumping" function.

In carrying out the invention in one form an electric controller is provided for controlling energization of a motor which is energized under control of an electromagnetic contactor, the energization of which is in turn controlled by an undervoltage relay and a program timing switch. The undervoltage relay is controlled by means of an automatic restart timer which is operated from a timing motor through a clutch mechanism actuated under control of the undervoltage relay. The restart timer includes means for readily varying the restart timing period over a substantial range. The program switch is also operated from the timing motor in a manner so that it is intermittently operated to control energization of the contactor according to a predetermined schedule. The arrangement is such that when voltage is applied to the controller the timing motor is energized and the clutch mechanism is actuated to initiate operation of the restart timing period. After a preselected time, the restart timer switch closes to energize the undervoltage relay which simultaneously effects energization of the contactor and effects actuation of the clutch to reset the restart timer. If a voltage dip occurs or power is interrupted, the undervoltage relay drops out to deenergize the contactor and the motor and also to effect actuation of the clutch mechanism to begin a restart timing period after which the undervoltage relay is again energized to energize the contactor. This arrangement effectively minimizes "pumping" of the contactor.

Further objects and advantages of the invention will become apparent from the following description taken in conjunction with the accompanying drawings in which:

FIG. 1 is a schematic circuit diagram of the electric controller of the present invention;

FIG. 2 is a view in elevation showing parts of the controller employed to provide the programming function;

FIG. 4 is a view in side elevation of the parts illustrated in FIG. 3.

Figure 3:
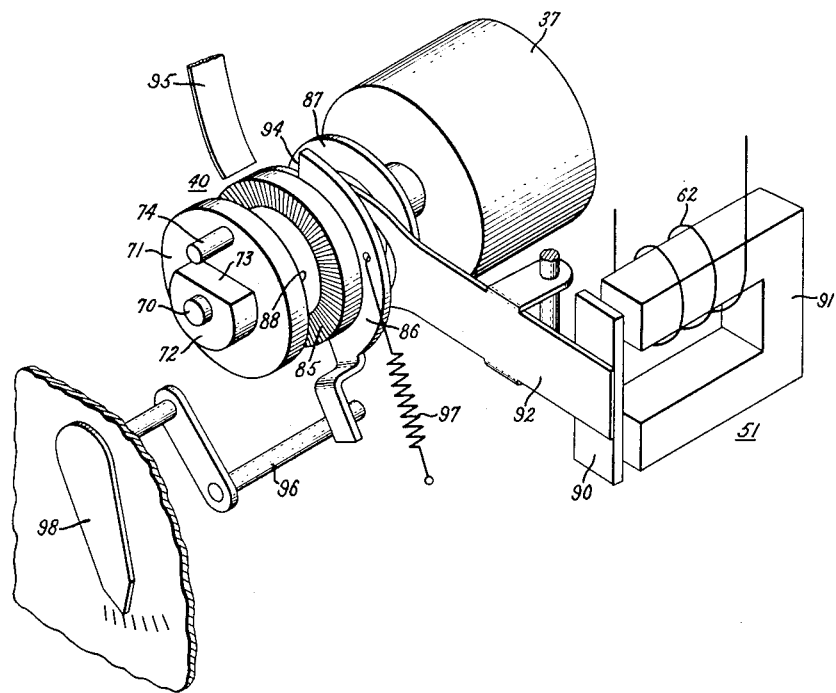
FIG. 3 is a view in perspective showing the timing motor and associated parts employed in performing the automatic restarting function.

Referring now to the drawing there is schematically illustrated in FIG. 1 the electric controller of the invention shown in association with one of a plurality of motors 10 each energized from a common three phase electric power source 11. Each of the motors 10 is connected for energization from the source 11 through a separate branch circuit 12 and a separate control circuit 13. One of the circuits 13 is shown as included in the broken line rectangle and will be described in detail hereinafter.

Each branch circuit 12 is comprised of phase conductors 14, 15 and 16 which include contacts of a conventional line switch 17 and line fuses 18. Each motor 10 is energized under the control of a separate motor contactor 19, each contactor including three movable contacts 20 adapted to engage fixed contacts 21 to connect the circuit 12 to the motor 10 through conductors 23, 24 and 25. The movable contacts 20 are operatively connected for movement as a unit in response to movement of a magnetic armature 28 surrounded by coil 29 one end of which is connected to the conductor 15 through a conductor 30 and through fixed contacts 31 which cooperate with movable contacts 32 of a pair of overload relays 33. The relays 33 may assume various forms, such as thermal relays, and are illustrated in the form of electromagnetic relays with the movable contacts 32 connected to magnetic armatures 34 surrounded by coils 35 which are connected to the conductors 23 and 25.

The contactors 19 of the several circuits 13 are each energized under the control of a timing device 36 including a timing motor 37 connected through conductors 38 to the conductors 15 and 16 of the circuit 12. With such connections the motor 37 is energized whenever power is applied to the circuit 12. The timing motor 37 is effective when energized to operate a program switch 41 through a suitable reduction gear train 42. As will presently appear, the switch 41 is arranged to be opened and closed at selected times for predetermined intervals. and such times and intervals may be adjusted to give a desired operating cycle for each motor. The program switch includes a switch 43 which is connected to control energization of the contactor 19 when a manually operable control switch 44 is set in an "automatic" position.

The switch 44 includes two sets of fixed contacts 45 and 46, and has three operating positions comprising a "hand" position, an "automatic" position and an "off" position effective respectively to close the contacts 45, close the contacts 46 and close neither of the contacts 45 and 46. To this end the switch 44 includes a movable contact 47 which may be manually actuated to the "hand" position wherein it engages the contacts 45, the "automatic" position wherein it engages contacts 46, and the "off" position wherein it is intermediate the contacts 45 and 46. The switch 44 also includes a contact 48 movable with respect to a fixed contact 49 and which engages the contact 49 to effect energization of an undervoltage relay 50 only when the movable contact 47 is in its "off" position intermediate the fixed contacts 45 and 46.

The undervoltage relay 50 may be of any suitable design and is connected to control energization of the contactor 19 and the associated motor 10, the relay 50 being designed to pick up and permit energization of the contactor 19 only when the system voltage is above a predetermined level, and to drop out and prevent energization of the contactor when system voltage drops below a certain level. In accordance with the invention, the undervoltage relay 50 controls energization of a clutch actuating mechanism 51 for actuating a clutch 40 associated with the motor 37, and energization of the relay 50 itself is controlled by a restart timing switch 52 operated from the timing motor 37 through the clutch mechanism 40 when the clutch mechanism is actuated. The relay 50 is diagrammatically shown in the form of an electromagnetic relay including a magnetic armature 53 to which are mechanically connected for movement as a unit contacts 54, 55 and 56. The relay 50 includes an operating coil 57 which is connected across phase conductors 15 and 16 for energization therefrom when the restart timing switch 52 when this switch is closed as will be described more fully hereinafter. The movable contact 54 of relay 50 cooperates with normally open fixed contacts 60 and closes the fixed contacts 60 when coil 57 of relay 50 is energized to thereby permit energization of the contactor 19. The movable contact 55 of relay 50 cooperates with normally open fixed contacts 61 and closes the contacts 61 in response to energization of the coil 57 for establishing a sealing circuit for maintaining energization of the coil 57 subsequent to opening of the restart timer switch 52. As will be more fully described hereinafter the mechanism for actuating the clutch 40 includes an electromagnet 51 having a winding 62 connected across phase conductors 15 and 16 for energization through fixed contacts 63 which are normally closed by the movable contact 56 of relay 50. Operation of the control circuit will be described hereinafter.

Referring now to FIGS. 2–4 details of the program timer may now be described. The program timer is intermittently operated in accordance with the invention and to this end the timing motor 37 includes a rotatable shaft 70 which in the illustrated embodiment, carries a circular hub 71 having affixed thereto in any suitable manner a generally circular projection 72 with a segment thereof removed as at 73. The chordal plane of projection 72 is intermediate the shaft 70 and a pin 74 which is secured to the hub 71 to extend parallel to the shaft 70, and to extend perpendicular to a line connecting the shaft 70 and pin 74. The pin 74 cooperates with a plurality of angularly spaced radially extending slots 75 formed at the periphery of a Geneva gear 76 which is rotatable about an axis parallel to the shaft 70. The slots 75 are spaced by a plurality of barriers 77 having outer concave surfaces which conform to the curvature of the periphery of the projection 72 and which are engagable with such periphery. In the preferred embodiment the motor 37 is arranged to rotate approximately one revolution every fifteen minutes to effect indexing rotation of the Geneva gear through approximately one revolution every two hours, the Geneva gear being indexed every fifteen minutes through about one-eighth of a revolution by action of the pin 74 and slots 75. Other motor speeds may be employed as desired. Removal of a segment of projection 72 provides clearance for the barriers 77 as the gear 76 is rotated.

A gear 78 is mounted to be rotated with the Geneva gear 76 and is in meshing engagement with a dial gear 79 to which is frictionally mounted a timing wheel 80 which may be of the type disclosed in U.S. Patent 2,864,049 and which carries a plurality of radially adjustable switch actuating parts 81, the parts 81 when in their positions illustrated at the right as viewed in FIG. 2 being effective to depress a spring 82 for closing the switch 43 and the parts 81 when in their positions shown at the left in FIG. 2 being incapable of depressing the spring 82 for closing the switch 43 whereby switch 43 is open. The arrangement is such that the dial gear 79 and the dial 80 are rotated through one revolution for each twenty-four hour period and to this end the gear ratio between the gears 78 and 79 is selected to be twelve to one. With the described arrangement and with the motor shaft 70 rotating in a counterclockwise direction as viewed in FIG. 2, one revolution of the motor 37 is effective to cause indexing rotation of the dial 80 in a counterclockwise direction through one-ninety sixth of a revolution corresponding to a fifteen minute period and the parts 81 are set so that the switch 43 is alternately open and closed for fifteen minute periods. The dial 80 is preferably frictionally attached to the gear 79 so that the dial 80 can be rotated with respect to the gear 79 for adjustment purposes. When the Geneva gear is not being indexed by the pin 74, it is locked against rotation by means of the engaging surfaces of the projection 72 and one of the barriers 77 which thereby locks the gear train and permits convenient adjustment of the dial 80 relative to the gear 79. It is thus seen that with the described arrangement the gear train consisting of gears 76, 78 and 79 is immobile at least seventy-five percent of the time which results in very little wear on the gear train. Also, the intermittent movement of the dial 80 is more rapid than a continuous movement thereof and results in a more positive actuation of the switch 43.

While the program timer has been described as providing a fifteen minute "on" and fifteen minute "off" schedule, it can be appreciated that other schedules may be provided as desired.

With reference to FIGS. 3 and 4 the restart timing mechanism may now be described. In the present invention the restart timing mechanism is driven from the motor 37 through the clutch mechanism 40 mounted on the motor shaft 70, the clutch mechanism including an assembly mounted for sliding movement with respect to the shaft 70. The slidable assembly in the illustrated embodiment includes a clutch plate 85, a cam 86 and a back stop 87 secured together in any suitable manner for movement longitudinally of the shaft 70 as a unit relative to a clutch face 88 formed on the rear of the hub 71. When the coil 62 of the electromagnet 51 is energized, a pivotally mounted magnetic armature 90 is pivoted toward the magnetic core 91 of the electromagnet 51 which effects movement of a fork 92 attached to the armature 90, the fork 92 having arms located between the cam 86 and the plate 87 which move toward the left as viewed in FIG. 4 for displacing the clutch plate 85 into engagement with the clutch face 88.

When the clutch parts 85 and 88 are in engagement, the cam 86 rotates with the motor shaft 70 in a counter-clockwise direction as viewed in FIG. 3 away from a reset position toward a switch actuating position, the cam 86 including a flat leading surface 94 which engages a lever arm 95 for actuating the switch 52 a predetermined time after energization of the electromagnet 51. The cam 86 is biased towards a stop pin 96 by action of a return spring 97 secured to the cam and to a part of the device frame, the pin 96 determining the cam reset position and being attached to a pointer assembly 98 which is mounted by the device frame for rotatable adjustment about an axis parallel to the shaft 70 to thereby vary the angular position of the pin 96 relative to the arm 95. By this means the time of delay of actuation of the switch 52 after energization of electromagnet 51 may be conveniently varied over a substantial range. For example, the arrangement may be such that the restart timing period is adjustable throughout the range of thirty seconds to five minutes.

In operation, the switch 44 is initially placed in the "off" position wherein the contact 47 is intermediate the fixed contacts 45 and 46 and the contact 48 engages contact 49. Application of power to the controller effects energization of winding 57 of undervoltage relay 50 which picks up to move its contact 54 into engagement with fixed contacts 60 to condition the contactor 19 for energization, contact 55 into engagement with contacts 61 to establish the sealing circuit, and contact 56 out of engagement with fixed contacts 63 to prevent energization of electromagnet 51. Application of power also energizes motor 37 which begins operation of program time switch 41. Let it be assumed now that the switch 44 is actuated to the "automatic" position wherein the contact 47 engages fixed contacts 46 and contact 48 is moved out of engagement with contact 49. For this condition the relay 50 remains energized through its sealing circuit and the contactor 19 and motor 10 are energized and deenergized in accordance with the schedule predetermined by the program time switch 41. Since the contacts 63 are open at this time, the electromagnet 51 is deenergized and the cam 86 of the restart timing mechanism is in engagement with the stop pin 96 in its reset position.

In the event of a power failure, the undervoltage relay 50 will drop out to open contacts 60 for deenergizing contactor 19, to open contacts 61 for interrupting the sealing circuit, and to close contacts 63 to condition the clutch actuating electromagnet 51 for energization. When power is subsequently restored, the winding 62 of electromagnet 51 is energized through closed contacts 63 to engage the clutch mechanism 40 and since the motor 37 is now energized, the cam 86 of the restart timing mechanism begins to rotate away from the stop pin 96 towards the switch actuating spring 95. After a predetermined time as determined by the angular position of the pointer 98 and the pin 96, the leading edge 94 of cam 86 will engage arm 95 to effect operation of switch 52 to thereby energize coil 57 of undervoltage relay 50 which closes contacts 60 and 61 and opens contacts 63. Closure of contacts 60 results in energization of contactor 19 and motor 10, closure of contacts 61 energizes the sealing circuit, and opening of contacts 63 effects deenergization of the electromagnet 51 with the result that the clutch parts 85 and 88 are disengaged and the cam 86 is rotated by spring 97 in the clockwise direction as viewed in FIG. 3 back to its reset position against the stop pin 96.

In the even that system voltage should subsequently dip below the drop out point of undervoltage relay 50, the undervoltage relay 50 will drop out which effects deenergization of motor 10 and which effects energization of the electromagnet 51 to thereby start the restart timing cycle assuming sufficient voltage is available to effect operation of motor 37. If normal voltage has been restored at the end of the restart timing period, the relay 50 picks up through closed contacts 52 to energize motor 10 and to reset the restart timer. It is thus seen that the delay in energization of the relay 50 provided by the restart timer after restoration of normal voltage will be effective in many cases to entirely prevent contact "pumping" and in all cases will at least minimize the damaging effects of "pumping."

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desired to secure by Letters Patent of the United States is:

1. In an electric controller, a switching device energizable from the voltage source for controlling energization of a load from the voltage source, a starting timer energizable from the voltage source for controlling energization of the switching device, said timer being operable to effect energization of the switching device a preselected time after the timer is energized, and means including said switching device for controlling energization of said timer, said switching device being effective when energized to prevent energization of said timer and being effective when deenergized to permit energization of said timer.

2. In an electric controller, a switching device energizable from the voltage source for controlling energization of a load from the voltage source, a starting timer energizable from the voltage source for controlling energization of the switching device, said timer being operable to effect energization of the switching device a preselected time after the timer is energized, means including said switching device for controlling energization of said timer, said switching device being effective when energized to prevent energization of said timer and being effective when deenergized to permit energization of said timer, and means for varying the timing period of said timer over a substantial range.

3. In an electric controller, undervoltage responsive means energizable from a voltage source and operable for controlling energization of a load from the voltage source, said undervoltage responsive means having first and second operating conditions for normal voltage and undervoltage of the voltage source effective respectively to permit and prevent energization of the load, a starting timer energizable from the voltage source for controlling energization of the undervoltage responsive means, said timer being operable to effect energization of the undervoltage responsive means a preselected time after the timer is energized, and means including said undervoltage responsive means for controlling energization of said timer, said undervoltage responsive means being effective when in said first condition to prevent energization of said timer and being effective when in said second condition to permit energization of said timer.

4. In an electric controller, undervoltage responsive means energizable from a voltage source and operable for controlling energization of a load from the voltage source, said undervoltage responsive means having first and second operating conditions for normal voltage and undervoltage of the voltage source effective respectively to permit and prevent energization of the load, a starting timer energizable from the voltage source for controlling energization of the undervoltage responsive means, said timer being operable to effect energization of the undervoltage responsive means a preselected time after the timer is energized, means including said undervoltage responsive means for controlling energization of said timer, said undervoltage responsive means being effective when in said first condition to prevent energization of said timer and being effective when in said second condition to permit energization of said timer, and means for varying the timing period of said timer over a substantial range.

5. In an electric controller, a switching device energizable from a voltage source for controlling energization of a load from the voltage source, a motor energizable from the voltage source, a program timer for controlling energization of said load and driven from said motor, a starting timer energizable from the voltage source for controlling energization of said switching device, a connectable and disconnectable drive means between said motor and said starting timer, said starting timer being operable to effect energization of said switching device a predetermined time after connection of said drive means, and means including said switching device for controlling connection and disconnection of said drive means.

6. A controller as defined in claim 5 wherein said switching device is effective when energized to prevent connection of said drive means, and is effective when deenergized to permit connection of said drive means.

7. A controller as defined in claim 5 wherein said starting timer includes a switch actuating cam rotatable between reset and switch actuating positions, an adjustable stop against which said cam is normally based in its reset position when said drive means is disconnected, and means for adjusting sai dstop to vary the reset position of said cam.

8. In an electric controller, undervoltage responsive means energizable from a voltage source and operable for controlling energization of a load from the voltage source, said undervoltage responsive means having first and second operating conditions for normal voltage and undervoltage of the voltage source effective respectively to permit and prevent energization of the load, a motor energizable from the voltage source, a program timer for controlling energization of the load and driven from said motor, a starting timer energizable from the voltage source for controlling energization of the undervoltage responsive means, a connectable and disconnectable drive means between said motor and said starting timer, said starting timer being operable to effect energization of said undervoltage responsive means a preselected time after connection of said drive means, and means including said undervoltage responsive means for controlling connection and disconnection of said drive means, said undervoltage responsive means being effective when in said first condition to prevent connection of said drive means and being effective when in said second condition to permit connection of said drive means.

9. A controller as defined in claim 8 wherein said starting timer includes a switch actuating member movable from a reset position to a switch actuating position when the drive means is connected, and adjustable stop means engageable with said switch actuating member to stop the member in its reset position.

10. In an electric controller, a motor energizable from a voltage source and having a shaft, a part fixed on said shaft having a generally circular peripheral portion, a pin spaced radially from said shaft and mounted for rotation with the shaft, a Geneva gear rotatable about an axis parallel to the axis of rotation of said shaft, said Geneva gear having a plurality of angularly spaced slots engageable by said pin in response to rotation of said shaft, and having a plurality of concave barriers intermediate the slots engageable with the peripheral portion of said part, a program timing dial driven from said Geneva gear for controlling energization of a load from the voltage source, fixed and slidable clutch parts on said shaft, an angularly adjustable stop, a switch actuating member on said slidable clutch part rotatable between reset and switch actuating positions, biasing means biasing said switch actuating member towards its reset position wherein it engages said stop, electroresponsive means energizable from the voltage source to effect engagement of said clutch parts for permitting rotation of said switch actuating member away from said stop when said motor is energized, said biasing means being operable to return said switch actuating member into engagement with said stop in response to deenergization of said electroresponsive means, undervoltage responsive means energizable from the voltage source for controlling energization of the load and of the electroresponsive means, said undervoltage responsive means being effective in response to a dip in voltage of the source for preventing energization of the load and for permitting energization of said electroresponsive means, and a switch operated by said switch actuating member and effective when operated to permit energization of said undervoltage responsive means, said undervoltage responsive means being effective when energized by normal voltage to deenergize said electroresponsive means and to permit energization of said load.

11. In an electric controller, a motor energizable from a voltage source and having a shaft, a program timer driven from said motor for controlling energization of a load from the voltage source, fixed and slidable clutch parts on the motor shaft, a switch actuating member on the slidable clutch part rotatable between reset and switch actuating positions and biased towards its reset position, electroresponsive means energizable from the voltage source to effect engagement of said clutch parts for permitting rotation of said switch actuating member away from its reset position when said motor is energized, said switch actuating member being returned to its reset position in response to deenergization of said electroresponsive means, switching means energizable from the voltage source for controlling energization of the load and of the electroresponsive means, said switching means being effective when energized to prevent energization of said electroresponsive means and to permit energization of said load, and effective when deenergized to permit energization of said electroresponsive means and to prevent energization of said load, and a switch operated by said switch actuating member and effective when operated to permit energization of said switching means.

12. In an electric controller, a motor energizable from a voltage source and having a shaft, a program timer driven from said motor for controlling energization of a load from the voltage source, fixed and slidable clutch parts on the motor shaft, a switch actuating member on the slidable clutch part rotatable between reset and switch actuating positions and biased towards its reset position, electroresponsive means energizable from the voltage source to effect engagement of said clutch parts for permitting rotation of said switch actuating member away from its reset position when said motor is energized, said switch actuating member being returned to its reset position in response to deenergization of said electroresponsive means, switching means energizable from the voltage source for controlling energization of the load and of the electroresponsive means, said switching means being effective when energized to prevent energization of said electroresponsive means and to permit energization of said load, and effective when deenergized to permit energization of said electroresponsive means and to prevent energization of said load, a switch operated by said switch actuating member and effective when operated to permit energization of said switching means, and an angularly adjustable stop engaging said switch actuating member in its reset position, said stop when adjusted varying the angular distance between said reset and switch actuating positons.

13. A controller as defined in claim 12 wherein said switching means comprises an undervoltage responsive relay.

References Cited by the Examiner

UNITED STATES PATENTS

| | | | |
|---|---|---|---|
| 1,835,342 | 12/31 | Schnell et al. | 317—22 |
| 2,064,656 | 12/36 | Goff | 317—22 X |
| 2,120,787 | 6/38 | Lowkrantz | 317—141 X |
| 2,287,617 | 6/42 | Jones | 317—13 |
| 2,864,049 | 12/58 | Sheets | 307—39 X |
| 2,984,716 | 5/61 | Timm et al. | 200—38 |
| 3,023,327 | 2/62 | Freedman et al. | 307—141.8 |
| 3,062,990 | 11/62 | Brown | 317—23 |
| 3,089,926 | 5/63 | Everard et al | 200—38 |
| 3,125,695 | 3/64 | Searle | 307—141.8 |
| 3,157,826 | 11/64 | Norton | 317—46 |
| 3,175,124 | 3/65 | Russell | 317—13 |

SAMUEL BERNSTEIN, *Primary Examiner.*